United States Patent
Rindoks et al.

[11] Patent Number: 5,994,644
[45] Date of Patent: Nov. 30, 1999

[54] MODULAR FURNITURE RACEWAY COMPONENT

[76] Inventors: Kurt P. Rindoks; Alan W. Stephenson, both of 2700 W. Front St., Statesville, N.C. 28677-2927

[21] Appl. No.: 09/027,373

[22] Filed: Feb. 20, 1998

[51] Int. Cl.$^6$ .................................................. H02G 3/22
[52] U.S. Cl. ..................... 174/48; 312/223.6; 108/50.02; 52/220.7
[58] Field of Search .................... 174/48; 108/50.02; 312/223.3, 223.6, 263, 257.1, 265.5, 265.1; 52/220.7, 220.1, 36.5, 36.4, 578, 582.1; 403/256, 260, 231, 261; 211/189, 186, 26, 191; 361/829

[56] References Cited

U.S. PATENT DOCUMENTS

| | | | |
|---|---|---|---|
| 3,374,590 | 3/1968 | Kessler | 52/220.7 |
| 3,377,756 | 4/1968 | Polhamus | 52/220.7 |
| 3,866,377 | 2/1975 | De Schutter | 52/220.7 X |
| 4,255,610 | 3/1981 | Textoris | 174/48 |
| 4,433,630 | 2/1984 | Laborie | 174/48 X |
| 4,642,418 | 2/1987 | Menchetti | 174/48 |
| 4,784,552 | 11/1988 | Rebentisch | 403/348 X |
| 4,895,331 | 1/1990 | Nehls | 248/245 |
| 5,574,251 | 11/1996 | Sevier | 312/223.6 X |
| 5,592,794 | 1/1997 | Tundaun | 52/582.1 X |
| 5,685,113 | 11/1997 | Reuter et al. | 52/220.7 |
| 5,794,795 | 8/1998 | Stemmons | 211/191 X |

FOREIGN PATENT DOCUMENTS

| | | | |
|---|---|---|---|
| 476399 | 3/1992 | European Pat. Off. | 174/48 |

OTHER PUBLICATIONS

"3000 Two–Piece Steel Surface Raceway," Wiremold Wire Management Systems product brochure (trifold), 1997.

"3000 Surface Metal Raceway Product Specifications," Wiremold Wire Management Systems product brochure (3 printed pages), 1997.

"G3000 System Product Application," Wiremold Wire Managment Systems product brochure (1 printed page), 1995.

*Primary Examiner*—Janet M. Wilkens
*Attorney, Agent, or Firm*—Kennedy Covington Lobdell & Hickman

[57] ABSTRACT

An integrated raceway component for use in a modular furniture system which includes a pair of longitudinally extending channel members disposed in spaced parallel relationship to one another, each channel member having wall portions defining an open cavity for storing one or more wires therein and having extending end portions that form a longitudinally extending slot for receiving such wires. The end portions are formed to receive and support a mounting fastener within the cavity and resilient brushes are mounted in the end portions to extend across the slot. A connecting wall portion connects the channel members with a space therebetween, and a wire raceway members is received between the channel members. The wire raceway is slidably inserted between said channel members and retained thereat, and the wire raceway includes a cover plate having electrical outlets therein.

11 Claims, 6 Drawing Sheets

5,994,644

MODULAR FURNITURE RACEWAY COMPONENT

BACKGROUND OF THE INVENTION

The present invention relates generally to modular furniture systems such as those used at computer stations and the like, and more particularly to an integrated raceway component for use in such systems.

Modular furniture systems are, of course, well known, and they typically consist of a number of separate components which are connected together to form the system, a representative system of this type being disclosed in U.S. Pat. No. 5,092,253. In copending U.S. patent application Ser. No. 08/818,627, filed Mar. 14, 1997, a unique support post is disclosed which can support other elements of the modular furniture system, and which is easily assembled with the such elements.

Some attention has been given to managing the various electrical wires that are inherently present when the modular system is used, such as the power supply lines and the electrical wires that form part of the electrical devices supported by the modular system (e.g., computers, printers, etc.). One typical way of containing and managing these wires is to permanently connect a steel raceway that is hollow underneath a support shelf on which the electrical devices are supported so that the hollow raceway runs generally horizontally, and the electrical lines are fed or pulled through the hollow raceway and contained therein. Such raceways are often placed at locations which may crowd the user of the electrical devices, and they are difficult to assemble and use. Also, since these raceways generally run horizontally, some arrangement must be made for dealing with the electrical lines and wires that extend out through the ends of the raceways.

It is also generally known to use unshaped channels to contain electrical wires, and to provide resilient brushes extending over the open end of the channel that permit electrical wires to be inserted into the channel through the brushes and that also provide a cover for the open side of the channel. However, it is not believed that these brushes have ever been effectively used in conjunction with the components of a modular furniture system.

In accordance with the present invention, an integrated raceway component is provided for use in a modular furniture system that is easy to assemble with other components of the system and provides structural support for the system, while also providing a particularly effective arrangement for containing and managing, the electrical lines and wires inherently associated with such systems.

SUMMARY OF THE INVENTION

In accordance with the present invention, an integrated raceway component for use in a modular furniture system is provided, and this raceway component comprises a pair of longitudinally extending channel members disposed in spaced parallel relationship to one another, with each channel member having wall portions defining an open cavity for storing one or more wires therein. These wall portions have extending end portions that form a longitudinally extending slot for receiving said wires, and the end portions are formed to receive and support a mounting fastener within the open of the channel members and adjacent the slot. A connecting wall portion connects the channel members so that a space is provided therebetween, and a wire raceway member is provided which is dimensioned to be received between the spaced channel members and adjacent the connecting wall. A retaining arrangement is provided for permitting the wire raceway to be slidably inserted between the channel members and retained thereat. Accordingly, the integrated raceway component provides a composite wire management system for containing both electric power wiring and individual electrical device wires while permitting the integrated raceway component to be readily connected to other components in a modular furniture system.

In the preferred embodiment of the present invention, each of the channel members is a u-shaped, and includes two spaced side walls, and the extending ends of these side walls define the aforesaid open slot. Resilient brush members are mounted at the extending ends of the side wall and extend across the open slot to provide a cover for the cavity in the channel members, whereby individual electrical device wires can be readily inserted in the channel through the resilient brush members and retained in the cavity. Also, the outwardly facing wall portions may be formed with a projecting wall portion shaped to be received by a support stanchion for the modular furniture, whereby the integrated raceway component can be mounted between two support stanchions to provide a trim filler therebetween.

Preferably, the spaced side wall portions of the channel members extend generally perpendicular to the connecting wall portion with one side wall portion of each channel member facing a side wall of the other channel member to define a space therebetween. The retaining assembly includes outwardly extending detents formed in each of the facing wall portions of the channel members, and also includes a shoulder formed on the wire raceway member that is removably retained by the detents when the wire raceway member is slidably inserted in the spacing between the channel members.

DESCRIPTION OF THE PREFERRED EMBODIMENT

Figure 1:
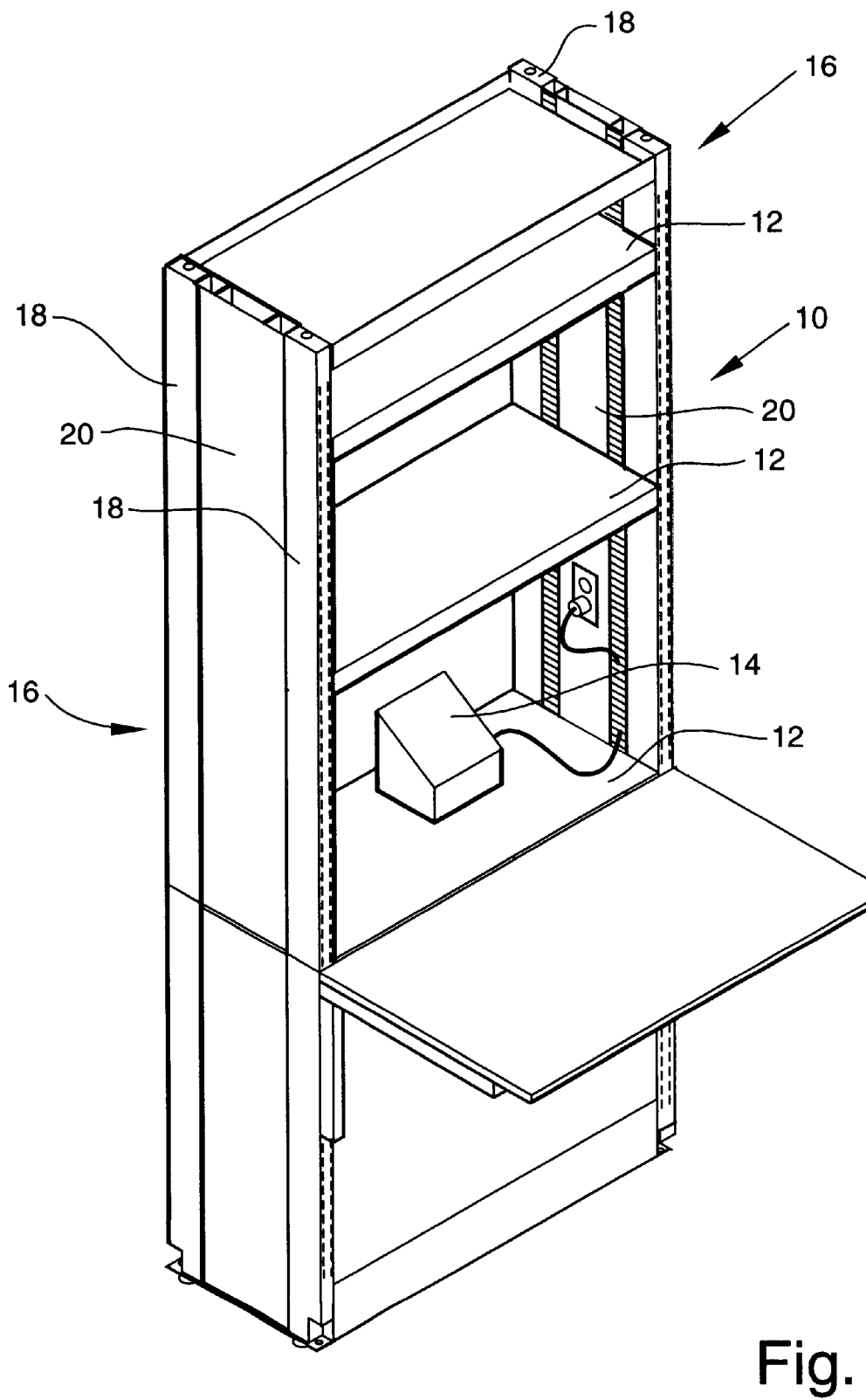
FIG. 1 is an elevational view of a modular furniture system that includes an integrated raceway component of the present invention.

Looking now in greater detail at the accompanying drawings, FIG. 1 illustrates a modular furniture system made up of a number of different components that will be described in greater detail presently, and, in general, this modular furniture system 10 is designed to provide shelves 12 on which are supported any desired electrically operated device, one of which is diagrammatically illustrated in FIG. 1 by the reference numeral 14, and to provide additional work surfaces and shelving for carrying accessory items used with such electrical devices 14. The support for the shelves 12 and other work surfaces is provided by vertically extending side panels 16 at each side of the modular unit 10 that support the shelves 12 therebetween. Each side panel is formed of two modular support posts 18 which are described in greater detail in the aforesaid U.S. patent application Ser. No. 08/818,627, and an integrated raceway component mounted between the two modular support posts 18.

Figure 2:
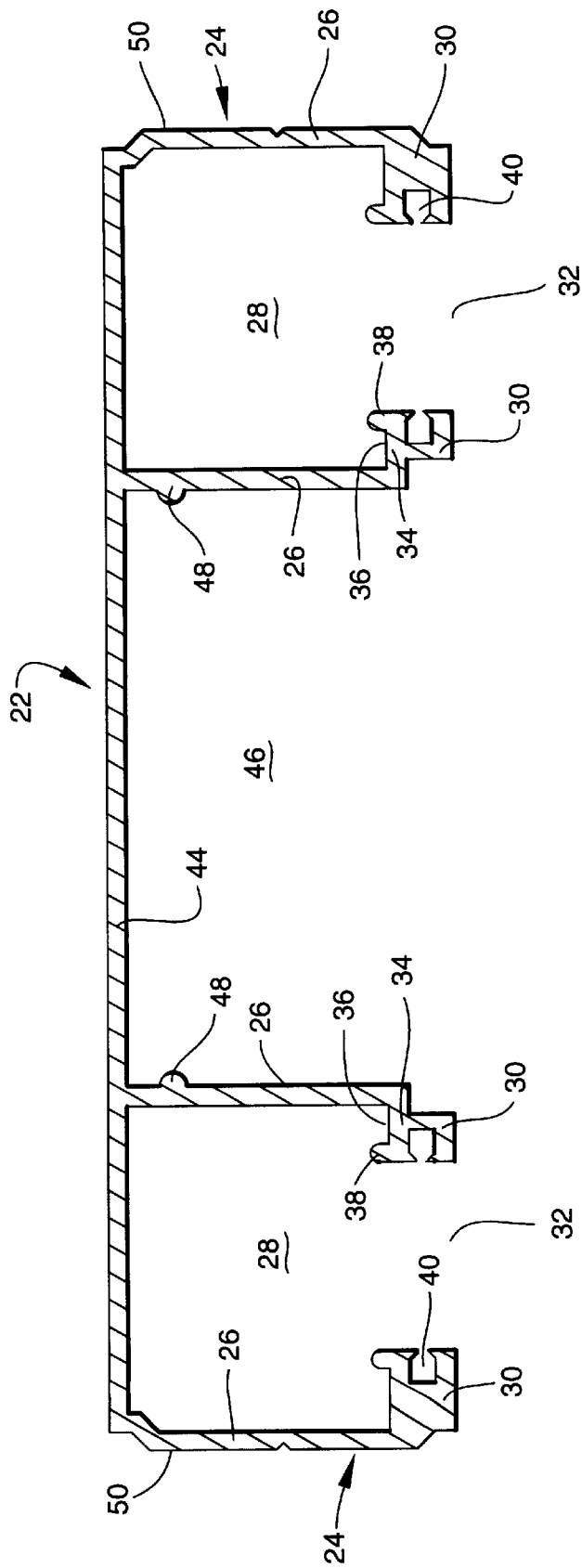
FIG. 2 is a section view of one element of the integrated raceway component of the present invention.

As best seen in FIG. 2, the raceway component 20 includes a housing element 22 that consist of a pair of longitudinally and vertically extending U-shaped channel members 24 disposed in space parallel relationship to one another, with each channel member having two side wall portions 26 that extend in generally spaced parallel relation to one another to define an open cavity 28 therebetween. The extending end portions 30 of the side walls 26 form a longitudinally and vertically extending slot 32 that provides access to the cavity 28 in a matter to be described in greater detail presently.

Each of the side wall end portions 30 is formed with support wall portions 34 that extend inwardly toward one another at the slot 32. Each of these support wall portions 34 include an inwardly facing support surface 36, and an outwardly extending shoulder 38. Additionally, the facing surfaces of the support wall portions 34 are formed with a groove 40 in which resilient brushes 42 are mounted to extend toward one another across the slot 32 as best in seen in FIG. 6.

A connecting wall portion 44 connects the two channel members 24 so that the inner most side walls 26 thereof extend generally parallel to one another to define a space 46 therebetween. Each of the facing inner most side walls 26 are formed with a vertically extending shoulder or detent 48, and the outermost side walls 26 are formed with projecting wall portions 50 that are shaped to be received by one of the support post 18, all in a manner to be described in greater detail below.

Figure 4:
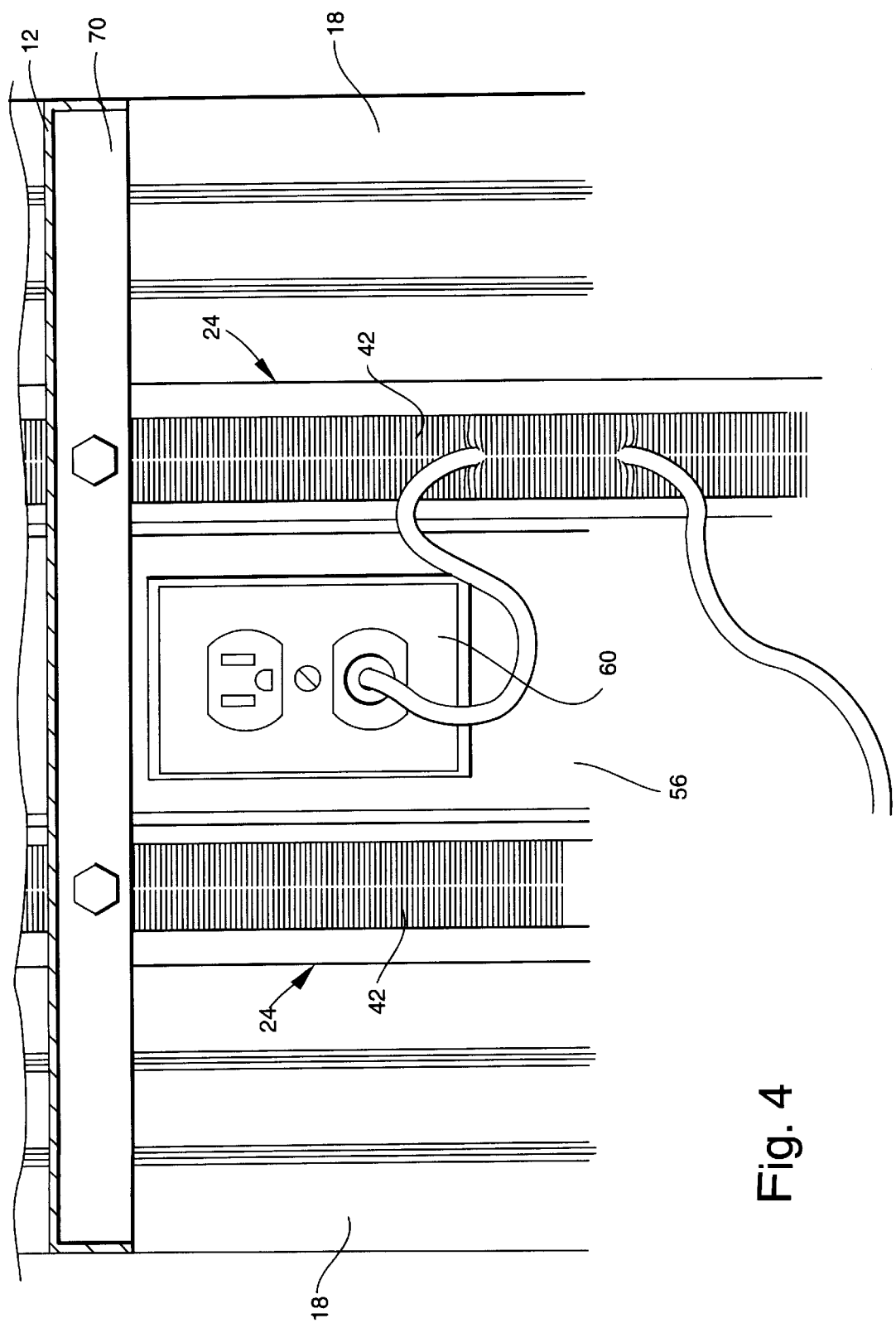
FIG. 4 is a detail view of a portion of the integrated raceway component of the present invention illustrating an electrical wire partially contained therein.
Figure 5:
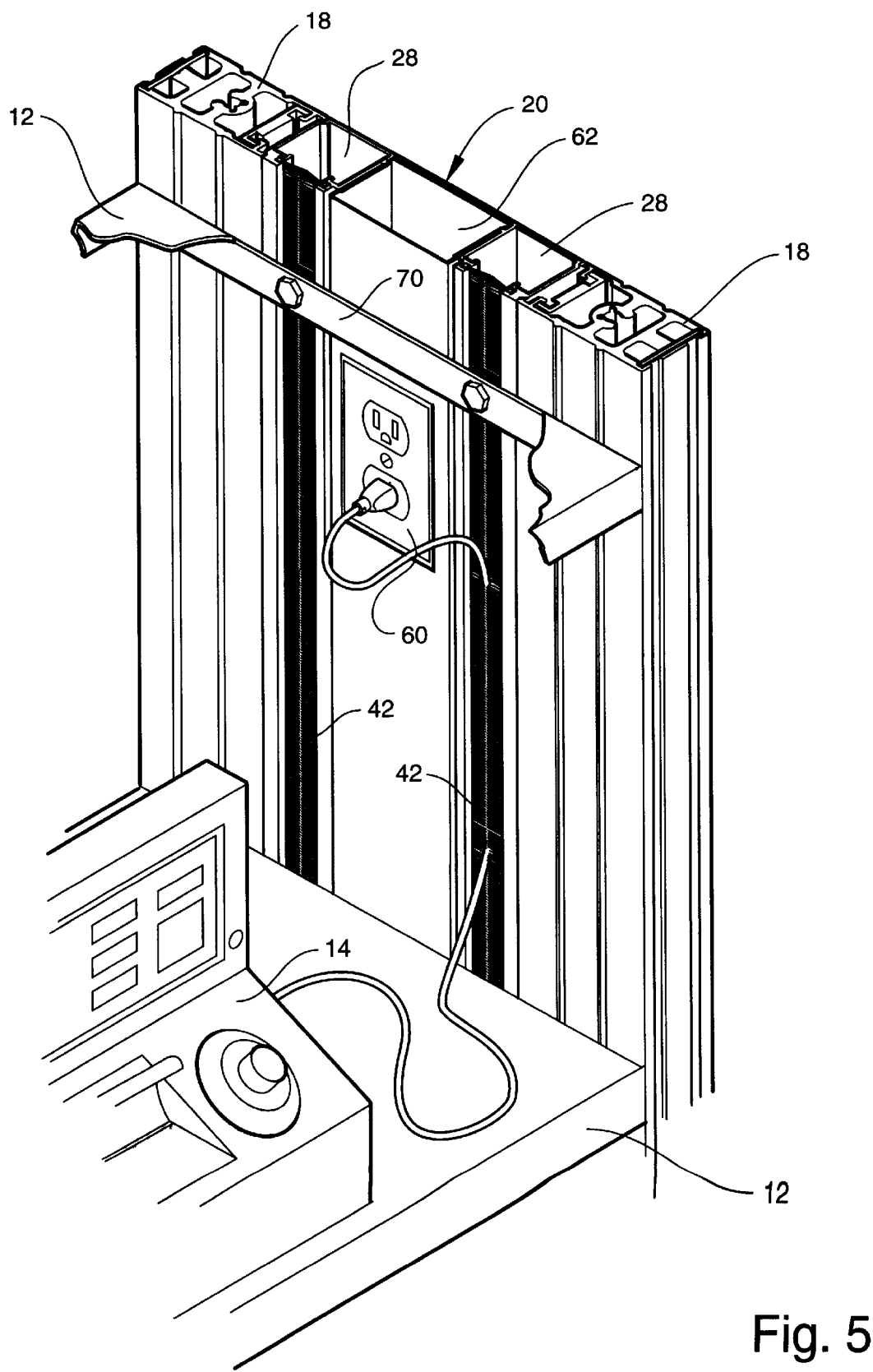
FIG. 5 is another detail view of a portion of the integrated raceway component of the present invention illustrating its attachment to other components of the modular furniture system.
Figure 6:
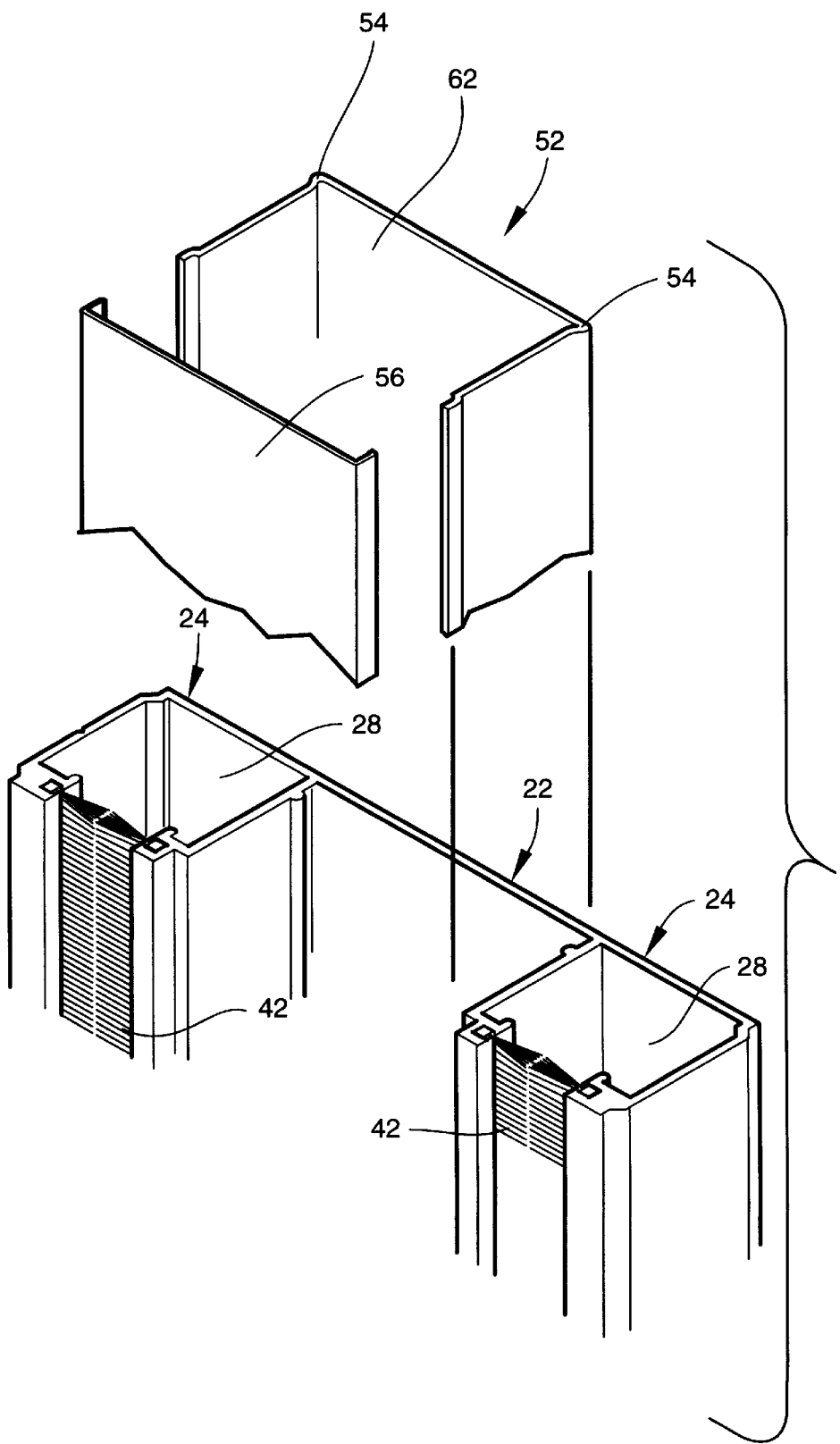
FIG. 6 is another detail view illustrating the connection arrangement between two elements of the integrated raceway component of the present invention.

As best seen in FIGS. 5 and 6, the modular raceway component 20 also includes a wire raceway member 52 that is dimensioned to be received between the two channel members 24 and to be in abutting relation with the connecting wall 44. This raceway member 52 is preferably a Model No. G3000 raceway sold under the trademark WIREMOLD, and as best seen in FIG. 6 it includes a shoulder 54 projecting outwardly from the back wall of the raceway 52. The raceway 52 also includes a separate front panel member 56 which can be selectively mounted in place on the raceway member 52 to provide electrical outlets 60, one of which is illustrated in FIG. 4. It will be understood that the front panel 56 may be provided with any desired number of outlets positioned at any desired locations along the vertical length thereof to provide convenient plug-in access for the electrical lines extending from the electrical devices 14. The raceway member 52 provides a cavity 62 that is large enough to readily accommodate conventional electrical wiring, such as wiring that connects a power source to the electrical outlets 60, data lines, and phone lines (not shown).

Figure 3:
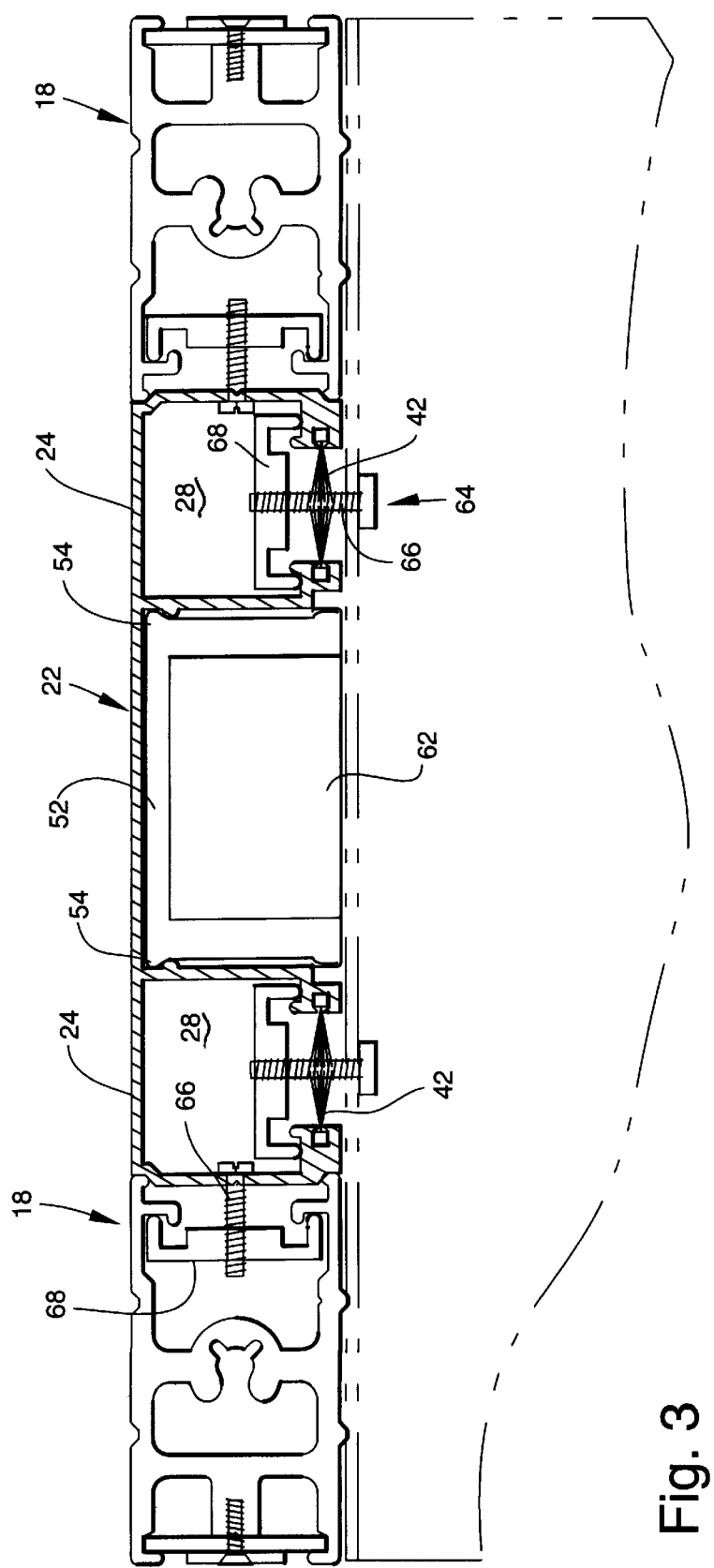
FIG. 3 is a top view of the integrated raceway component of the present invention.

In use, the raceway member 52 is first inserted in the space 46 between the channel members 24 by sliding the raceway member 52 downwardly into the space 46 so that the shoulders 54 slide into the openings between the detents 48 and the connecting wall 44. Then, the modular raceway component 20 is mounted between two support posts 18 as best seen in FIG. 3, and it will be noted that the projecting wall portions 50 on the outwardly facing side walls 26 nest in openings provided in the support post 18, and a plurality of fasteners elements 64 are used to provide stability between the connected elements. Each of the fastener elements 64, which are conventional, include a bolt 66 threaded into a connector 68 which bears against support surfaces provided in the support posts 18. While only one fastener element 64 is illustrated in FIG. 3 between the support posts 18 and the modular raceway component 20, it will be understood that additional fastener elements will be located along the vertical length of the support posts at any desired locations.

Once the modular support posts 18 are connected to the modular raceway component to form the two side panel 16 illustrated in FIG. 1, any one of a variety of shelves and work surfaces 12 may be mounted between the side panels 16 at any desired vertical location. More specifically, and as best seen in FIG. 3 and FIG. 5, a shelf 12 is mounted directly to the modular raceway component 20 by inserting bolts 66 of the fastener element 64 through the flange 70 of a shelf 12 and then through brushes 42 to a threaded connection with the connector element 68 which are located within the cavity 28 of the channel members 24, and which are positioned to bear against the support surfaces 36 of the extending end portions of the channel members side walls 26 (see FIG. 3). After the desired shelving has been mounted at the desired vertical locations, any type of electrical device, such as a computer or testing equipment, can be placed on the shelves 12 and plugged into a conveniently located electrical outlet 60. Moreover, as best seen in FIGS. 4 and 5, since the electrical outlet 60 is conveniently located near such equipment in accordance with a feature of the present invention, the electrical wire extending from the device 14 to the electrical outlet 60 has a significant excess length that can occupy valuable work space and/or present a hazard or inconvenience to persons operating the device 14. However, with the present invention, and as best seen in FIGS. 4 and 5, any excess length of these electrical lines is readily accommodated in the cavities 28 provided by the two channel members 24, and it will be appreciated that this excess length of electrical wiring can be easily inserted in the cavities 28 by simply pushing the wiring through the resilient brushes 42. Once the wiring has been pushed through the brushes 42, the brushes 42 provide an anesthetically pleasing and functional cover across the slot 32 so that the wiring is retained in place and is out of sight.

Accordingly, the integrated raceway component 20 of the present provides a composite wire management system for containing data lines, phone lines, electric power wiring and individual electric device wires in the cavities 62 and 28, while permitting the integrated raceway component to be readily connected to other components of the modular furniture system 10. In the latter regard, and looking at FIGS. 1 and 5, it will be noted that the modular raceway component 20 provides an anesthetically pleasing trim filler between the support posts 18.

I claim:

1. An integrated raceway component for use in a modular furniture system, said raceway component comprising:

(a) a pair of longitudinally extending channel members disposed in spaced parallel relationship to one another, each of said channel members having wall portions defining an open cavity for storing one or more wires therein and having extending end portions defining a longitudinally extending slot in communication with the open cavity for receiving the wires, each of said longitudinally extending slots being contained in substantially the same vertical plane and said extending end portions of each said channel member being formed to receive and support a mounting fastener within the open cavity and adjacent said longitudinally extending slot;

(b) a connecting wall portion connecting said channel members with a space therebetween;

(c) a wire raceway member dimensioned to be received between said channel members and adjacent said connecting wall portion, said wire raceway member having a front panel member provided with at least one electrical outlet therein;

(d) retaining means for permitting said wire raceway member to be slidably inserted between said channel members and retained thereat, whereby said integrated raceway component provides a composite wire management system for containing data lines, phone lines, electric power wiring, and individual electrical device wires while permitting the integrated raceway component to be readily connected to other components in the modular furniture system.

2. An integrated raceway component as defined in claim 1, wherein each of said channel members comprise a substantially u-shaped member, and further comprising resilient brush members mounted at the extending end portions of each of said channel members and extending across the longitudinally extending slot to provide a cover for the open cavity, whereby individual electrical device wires can be readily inserted in the open cavity through the resilient brush members and retained in the cavity.

3. An integrated raceway component as defined in claim 1, wherein each of said channel members comprise a substantially u-shaped member and wherein said retaining means comprise outwardly extending detents formed in each of the substantially u-shaped members and a shoulder formed on said wire raceway member, said outwardly extending detents being adapted and positioned to removably retain said wire raceway member when the wire raceway member is slidably inserted in the space between said channel members.

4. An integrated raceway component as defined in claim 1, wherein said extending end portions of each of said channel members further define support wall portions adjacent the longitudinally extending slot, said support wall portions being adapted and positioned to provide a support surface within the open cavity for supporting mounting fasteners.

5. An integrated raceway component as defined in claim 4, wherein each of said support wall portions further define a shoulder extending into the respective open cavity.

6. An integrated raceway component as defined in claim 4, wherein said extending end portions further define at least one longitudinally extending groove adjacent the longitudinally extending slot in each of said channel members and further comprising resilient brush members mounted in the at least one longitudinally extending groove for extend across the longitudinally extending slot to provide a cover for the open cavity.

7. An integrated raceway component as defined in claim 1, further comprising at least one upwardly extending support stanchion and wherein each of said channel members comprises a u-shaped member and wherein said wall portions further define a projecting wall portion adapted and positioned to be received by said at least one support stanchion.

8. An integrated raceway component as defined in claim 1 wherein the front panel member of said wire raceway member extends substantially completely between said channel members.

9. An integrated raceway component for use in a modular furniture system that includes vertically extending support stanchions, said raceway component comprising:

(a) a pair of longitudinally extending channel members disposed in spaced parallel relationship to one another, each of said channel members being substantially u-shaped and having wall portions defining an open cavity for storing one or more wires therein and extending end portions defining a longitudinally extending slot for receiving the wires, each of the end portions defining support wall portions adjacent the longitudinally extending slot to provide a support surface within the open cavity for supporting mounting fasteners and each of the end portions further defining at least one groove having resilient brush members mounted therein and extending across the longitudinally extending slot to provide a cover for the open cavity;

(b) a connecting wall portion connecting said channel members;

(c) a wire raceway member dimensioned to be received between said channel members and adjacent said connecting wall portion; and (d) retaining means for permitting said wire raceway member to be slidably inserted between said channel members and retained thereat, said retaining means comprising at least one outwardly extending detent formed in each of said substantially u-shaped members and at least one shoulder formed on said wire raceway member, said at least one outwardly extending detent in each said member being adapted and positioned to removably retain said wire raceway member when the wire raceway member is slidably inserted in the space between said channel members, whereby the integrated raceway component provides a composite wire management system for containing both electric power wiring and individual electrical device wires while permitting the integrated raceway component to be readily connected to other components in the modular furniture system.

10. An integrated raceway component as defined in claim 9, wherein each of said u-shaped channel members defines a projecting wall portion adapted and positioned to be received by one of the support stanchions of the modular furniture system, whereby the integrated raceway component can be mounted between two support stanchions to provide a trim filler therebetween.

11. An integrated raceway component for use in a modular furniture system, said raceway component comprising:

(a) a housing defining at least one longitudinally extending channel member having wall portions defining a first open cavity for storing one or more wires therein and having extending end portions that form a longitudinally extending slot in communication with the first open cavity for receiving the wires, said end portions having resilient brush members for covering said longitudinally extending slot and for permitting said wires to penetrate said resilient members and be contained within the first open cavity; and (b) a longitudinally extending wire raceway member adjacent said channel member, said wire raceway member having a second open cavity formed therein for containing electric power wiring and having a longitudinally extending cover plate provided with at least one electrical outlet therein, said longitudinally extending cover plate and said resilient members being generally adjacent one another, whereby said integrated raceway component provides a composite wire management system for containing both electric power wiring and individual electrical device wires.

* * * * *